Patented Feb. 6, 1934

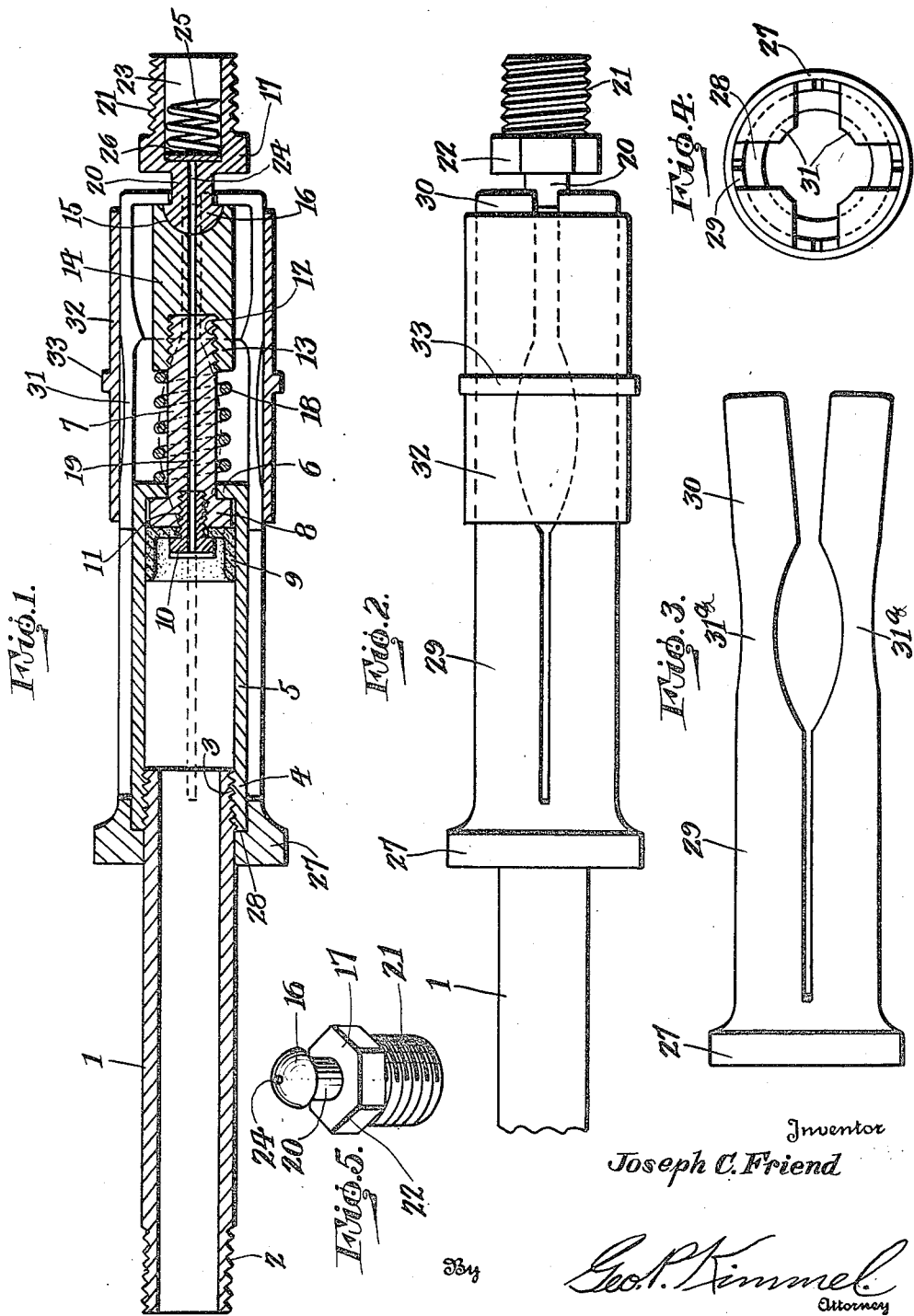

1,946,316

UNITED STATES PATENT OFFICE 1,946,316

LUBRICATING MEANS

Joseph C. Friend, Ashtabula, Ohio

Application July 1, 1933. Serial No. 678,706

2 Claims. (Cl. 285—173)

This invention relates in general to a coupling or connecting means, and more particularly has reference to a device for operatively connecting a means for supplying lubricant under pressure to a lubricant fitting for receiving the lubricant.

It is an object of this invention to provide a lubricating coupling and ball top fitting of the type set forth which can be connected to each other at any angle desired, and which will make a snug and well fitting connection thus preventing the escape of lubricant through the connection regardless of the pressure necessary to cause the lubricant to flow through the fitting. It is an object that this device will reduce the time necessary for the process of lubricating a particular machine, and to attain increased efficiency in carrying out such process.

It is a further object of this invention to provide a means for locking the coupler to the fitting in such a manner that it will be possible to force the lubricant through the parts at any necessary high pressure without permitting escape of the lubricant during the application.

Other objects and advantages of this invention will become apparent from the following description taken in connection with the accompanying drawing, it being distinctly understood that the same are by way of illustration and example only and are not to be taken as in any way limiting the spirit or scope of this invention. The spirit and scope of this invention are to be limited only by the prior art taken in connection with the accompanying claims.

Referring now more particularly to the drawing, in which like numerals indicate corresponding parts throughout:

Figure 1 is a longitudinal sectional view of a device constructed in accordance with this invention, illustrating the means for clamping the coupling in place on a lubricant fitting.

Figure 2 is a side elevation of the device illustrated in Figure 1.

Figure 3 is a detail of the element carrying the gripping jaws.

Figure 4 is an end view of the device illustrated in Figure 3.

Figure 5 is a perspective view of the ball top lubricant fitting forming a part of this invention.

In accordance with this invention, there is provided a connecting tube 1 threaded at its opposite ends 2 and 3 respectively. The threaded end 2 is adapted to be connected to the source of supply of lubricant under pressure, while the threaded end 3 is adapted to receive the interiorly threaded end 4 of the cylinder 5. The opposite end of this cylinder is partially closed by means of the radially extending flange 6, but is provided with a central opening through which the piston rod 7 is adapted to extend.

The piston rod 7 is illustrated as being integral with a piston 8 disposed within the cylinder 5, and having secured to its inner end a cup-shaped washer member 9. This washer member 9 as illustrated is secured in place by means of a screw 10 or the like, threadedly engaging the tapped opening 11 in the piston 8. It is noted that the washer 9 is of such size and shape as to bear firmly against the walls of the cylindrical member 5 and prevent escape of lubricant from the cylindrical member past the piston 8.

The outer end of the piston rod 7 is threaded exteriorly at 12 for the purpose of receiving the interiorly threaded end 13 of the coupler member 14. This coupler member 14 is provided with a hemispherical seat 15 in its end opposite the piston rod 7 for the purpose of receiving the hemispherical head 16 of the ball top fitting 17. Surrounding the piston rod 7 and confined between the inner end of the coupler member 14 and the adjacent end of the cylindrical member 5 is a spring 18 adapted to normally urge the assembly consisting of the piston 8, the piston rod 7 and the coupler member 14 outwardly with respect to the cylindrical member 5. The screw 10, the piston 8, the piston rod 7, and the coupler member 14 are provided with registering openings forming a continuous conduit or duct 19 from the interior of the cylinder 5 to the hemispherical seat 15.

The fitting 17 as previously mentioned is provided with a hemispherical or semi-ball-shaped head 16 connected to the main body portion of the fitting by means of a neck 20. The fitting is illustrated as being provided with threads 21 for the purpose of permanently connecting it with a bearing member to be lubricated, although it is to be understood that other means of connecting the fitting may be provided where found desirable. The fitting is likewise provided with a hexagonal-shaped portion 22 by which it may be screwed into a bearing member. The fitting is provided with a duct leading from the hemispherical head 16 through the neck 20 and opening into the interior 23 of the fitting. This duct 24 as illustrated is adapted to register with the duct 19 previously described when the coupler member is in its proper relation with respect to the fitting 17. Within the fitting there is provided a spring 25 sufficient to normally urge the disc 26 against the inner end of the duct 24 so as to close the duct and prevent backflow of oil through the fitting.

For the purpose of firmly securing this coupler mechanism just described to a fitting in such a manner that an unusually high pressure may be supplied without the escape of grease or oil, there is provided a retaining collar 27 surrounding the connecting tube 1 and having a shoulder 28 adapted to bear against the end of the cylindrical member 5. This retaining collar 27 is provided with a plurality of forwardly extending fingers 29 terminating in the retaining or gripping jaws 30 having inturned ends 31 which are so positioned to engage the fitting 17 just behind the head 16 when the head is properly seated in the seat 15 and firmly pressed into place. It is noted that the forwardly projecting fingers 29 are reduced at a point 31a intermediate their ends, at which point they are bent outwardly so that the gripping or retaining jaws 30 are normally spaced a considerable distance from each other. These fingers are made of resilient material, however, so that these jaws can be pressed into place to properly grip the fitting as just described.

Surrounding the fingers 29 is a sleeve 32 adapted when slid forwardly along the fingers 29 to draw them together into their locking position in which position they will properly retain the fitting 17 in place. When this sleeve, however, is withdrawn to a point adjacent the collar 27, it will be seen that the gripping jaws 30 will be allowed to swing outwardly thus releasing the fitting 17 from the coupler. It is noted in this connection, that the sleeve 32 is provided with a ridge 33 circumferentially thereof intermediate its ends so that the sleeve may be more firmly gripped for pushing it into locking position or retracting it therefrom.

From the above it will be understood that when it is desired to force lubricant into a fitting such as the fitting 17 by means of the connection embodying this invention, that the connection is placed with the seat 15 in contact with the hemispherical head 16 of the fitting 17 and is firmly pressed in place against the resistance of the spring 18. If greater pressure is to be exerted on the lubricant than can be conveniently held by pressing these two parts together, then the collar 27 is slid forwardly until the shoulder 28 contacts with the end of the cylindrical member 5, after which the sleeve 32 is slid forwardly over the fingers 29 so as to cause the gripping jaws 30 to come in contact into locking position behind the head 16 of the fitting 17 thus firmly locking this fitting in position. Lubricant may then be forced through the connection and into the fitting without leakage.

It is noted with regard to the device of this invention that the spring 18 which serves the function of exerting a continuous pressure between the pressure member 14 and the ball end 16 of the fitting is not in contact with the lubricant in any way nor is there any way in which the lubricant can escape to this spring and interfere with its operation. The cup-shaped washer member 9 positively prevents the escape of lubricant from the cylinder past the piston 8 and yet at the same time allows a free flow of lubricant from the cylindrical member 5 to the seat 15.

Since the fitting and the seat provided therefor are both spherical in shape, it will be seen that the connection may be applied to the fitting at whatever angle found necessary and desirable, and that a firm seating will always be formed between the two which will not permit of the escape of lubricant. It is understood, of course, that the end of the duct 24 of the fitting must always be in communication with the end of the duct 19 in the connection, but it will be perceived that this can readily be taken care of by a proper disposition and the designing of the ends of these parts.

Various changes in design and arrangements of parts can be employed as will be easily perceived without departing from the spirit or scope of this invention as set forth in the appended claims.

What I claim is:—

1. In combination with a ball top lubricant fitting, a coupler comprising a cylindrical member, a piston in said cylindrical member, means on the piston to prevent the flow of lubricant around the piston, a piston rod on said piston extending through one end of said cylindrical member, a coupler member on the outer end of said piston rod and having a coupler seat at its free end adapted to receive the end of a lubricant fitting, said piston, piston rod, and coupler member having registering openings forming a conduit from said cylindrical member to said coupler seat, means between the cylindrical member and the coupler member for urging said piston, piston rod, coupler assembly outwardly with respect to the cylindrical member, a plurality of retaining jaws opposing each other adjacent said coupler seat, said jaws being normally in expanded position, and means encircling said jaws and movable to contract said jaws into locking position to grip a lubricant fitting and hold it in position against the coupler seat.

2. Connecting means for lubricant guns comprising in combination a cylindrical member, a plunger in said cylindrical member, means to prevent the escape of lubricant from said cylindrical member past said plunger, said plunger having a part extending through one end of said cylindrical member, a coupler member on the outer end of said plunger and having a coupler seat at its free end, said plunger and coupler member having registering openings forming a conduit from said cylindrical member to said coupler seat, means for urging said plunger and coupler member outwardly with respect to the cylindrical member, a retaining collar normally surrounding said cylindrical member, said plunger, and said coupler member and being split to form a plurality of retaining jaws adjacent said coupler seat, said collar being slidable longitudinally with respect to said cylindrical member to uncover and allow access to said plunger and said coupler member.

JOSEPH C. FRIEND.